United States Patent [19]

Bouhours et al.

[11] Patent Number: 5,209,460

[45] Date of Patent: May 11, 1993

[54] HYDRAULIC ANTI VIBRATORY SUPPORTS

[75] Inventors: Jean-Paul Bouhours, Arrou; Daniel Dubos, Asnieres, both of France

[73] Assignee: Hutchinson, France

[21] Appl. No.: 710,430

[22] Filed: Jun. 7, 1991

[30] Foreign Application Priority Data

Jun. 7, 1990 [FR] France ................ 90 07088

[51] Int. Cl.⁵ ..................... F16F 13/00; B60K 5/12
[52] U.S. Cl. ................. 267/140.14; 267/140.13
[58] Field of Search ............. 267/140.1 A, 140.1 R, 267/140.1 E, 140.1 AE, 219, 35; 248/550, 636, 562

[56]         References Cited
         U.S. PATENT DOCUMENTS

| | | | |
|---|---|---|---|
| 4,653,734 | 3/1987 | Jordens | 267/140.1 |
| 4,699,099 | 10/1987 | Arai et al. | 267/140.1 AE |
| 4,765,601 | 8/1988 | Miller et al. | 267/140.1 A |
| 4,793,600 | 12/1988 | Kojima | 267/140.1 AE |
| 4,802,648 | 2/1989 | Decker et al. | 267/140.1 E |
| 4,836,515 | 6/1989 | Franz et al. | 267/140.1 A |
| 4,869,478 | 9/1989 | Bouhours et al. | 267/140.1 AE |
| 4,905,955 | 3/1990 | Brizzolesi et al. | 248/562 |

*Primary Examiner*—Matthew C. Graham
*Attorney, Agent, or Firm*—Larson and Taylor

[57]       ABSTRACT

The invention relates to a hydraulic antivibratory device comprising a rigid core, a rigid circular base and an annular supporting elastic wall sealingly connecting the core to the base, the inner space of the box so formed being filled with liquid L and the core being extended inside the box, by a rigid foot itself terminated by a piston whose contour defines, with the opposite wall portion a throttled annular passage for the liquid. The base is perforated by at least one port whose length is very much less than the mean diameter and the base, external to the box is capped by a flexible and sealed bellows adapted to form with it a pocket of variable volume.

8 Claims, 2 Drawing Sheets

HYDRAULIC ANTI VIBRATORY SUPPORTS

BACKGROUND OF THE INVENTION

The invention relates to hydraulic anti-vibratory devices intended to be inserted for support and shock-absorbing purposes between two rigid elements individually subject to certain oscillations or vibrations, said elements forming, for example, part, respectively of a vehicle chassis and of the internal combustion engine or of a suspension train of this vehicle.

The invention relates more particularly, among supports of the type concerned, to those which are constituted by a sealed box comprising a rigid core which can be made fast with one of the two rigid elements, a rigid base which can be made fast with the other rigid element, an annular elastic support wall, preferably of frustoconic shape, sealably connecting the core to the base, the inner space of said box being filled with a shock-absorbing liquid and the core being extended, on the inside of the box, by a rigid foot itself terminated by a shoe or piston whose contour defines, with the opposite wall portion of the box, a throttled annular passage for the liquid.

In supports of this type, the oscillations applied axially to the core or to the base are manifested by alternate back-thrusts of the piston in the liquid and, for a well-determined value $F_O$ of the alternation frequency of these back-thrusts, the annular column of liquid which occupies the throttled annular passage surrounding the piston is subjected to a resonance phenomenon which ensures excellent damping of the oscillations concerned.

The drawback of such supports resides in the value $F_O$ being imposed by the dimensions of the annular passage and hence difficult to modify.

Now it is often advantageous to be able to adapt supports of the type concerned to the preferential damping of oscillations whose frequencies have values $F_1, F_2 \ldots$ a little different from $F_O$, and to do this for given sizes of the annular passage, that is to say without it being necessary to replace the piston or the box in which this piston is immersed.

It is an object of the present invention to provide a particularly simple formula to resolve such a problem.

GENERAL DESCRIPTION OF THE INVENTION

Accordingly, supports of the type concerned are essentially characterized according to the invention in that the surface, of the base, outside the box is capped by a flexible and sealed bellows sealingly connected to this surface so as to form with it a pocket of variable volume for the liquid, and in that said base is perforated by a single or multiple port whose length is very much less than the average diameter, said port connecting the inner spaces of the box and of the pocket to one another.

Applicant has observed that, surprisingly, the presence of the above port in the base absolutely does not prevent "the piston effect" from occurring and that it suffices to modify the aperture cross-section of this port to modify the frequency corresponding to the preferential damping of the support, the value of this frequency increasing at the same time as said cross-section.

In preferred embodiments, recourse is had in addition to one and/or other of the following features:

for a diameter of the piston of the order of 50 to 70 mm, the length of the port is in the order of 2 to 3 mm and its mean diameter, of the order of 10 to 50 mm, the inner surface of the box is bounded in part by a flap valve or diaphragm mounted so as to be able to vibrate with movements of limited amplitude, the flap valve according to the preceding paragraph is mounted so as to be able alternately to obturate and clear the port, in a device according to any one of the two preceding paragraphs, the base is perforated in addition by at least one channel whose length is very much greater than the average diameter, said channel connecting the inner spaces of the box and of the pocket to one another, the degree of opening of the port can be regulated by means of a second obturator valve associated with external actuating means, the second obturator valve is rotary and connected angularly to the shaft of a small electric motor whose actuation is itself servo-coupled to the frequency of the oscillations to be damped to the maximum, the second obturator valve is displacable axially and comprises a frustoconic lip applicable against a frustoconic seat forming part of the base.

The invention comprises, apart from these main features, certain other features which are preferably used at the same time and which will be considered more explicitly below.

In the following, two preferred embodiments of the invention will be described referring to the accompanying drawings in a manner which is of course non-limiting.

DETAILED DESCRIPTION OF THE PREFERRED EMBODIMENTS

It is assumed by way of example that each of the supports concerned is designed to be inserted vertically or in a direction slightly inclined to the vertical between a rigid carrying member constituted by a vehicle chassis and a rigid supported member constituted by the internal combustion engine of this vehicle.

The ideas of upper and lower expressed in the description which follows are there as non-limiting since the support described can also be used in the reverse of the direction adopted for this description.

Figure 1:
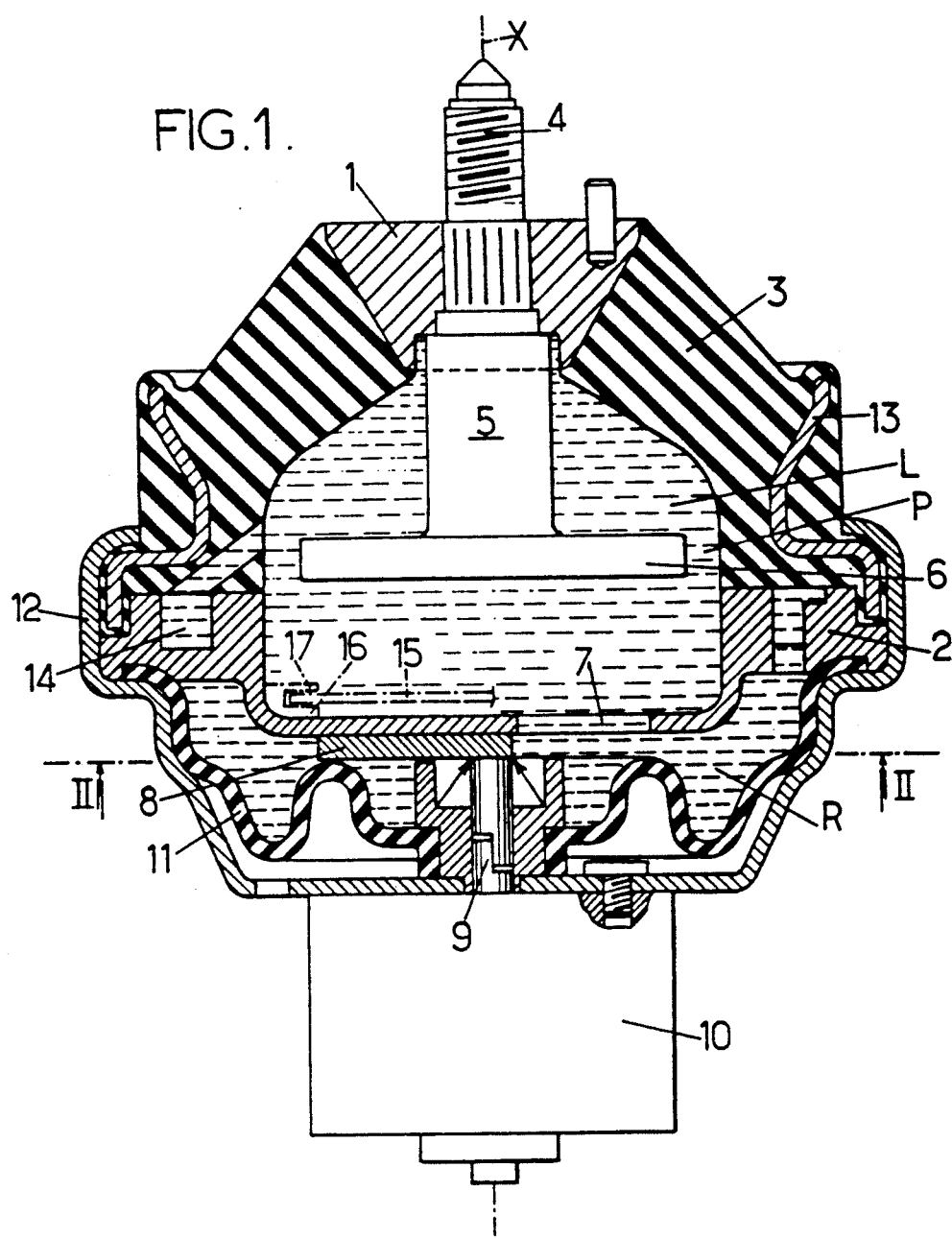
FIG. 1 shows in axial section an anti-vibratory support constructed according to the invention.
Figure 2:
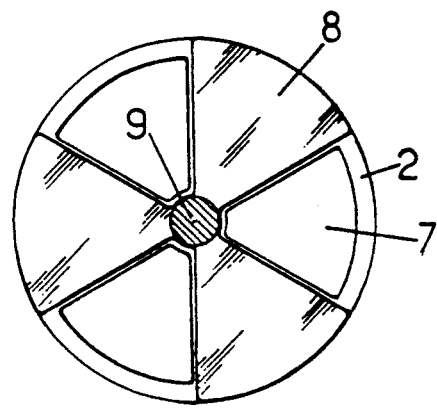
FIG. 2 is a partial cross-section of the same support along the arrows II—II, FIG. 1.

The support of FIGS. 1 and 2 is shown in the general shape of a sealed box of revolution around a generally vertical axis X, said box comprising:

an upper rigid core 1, a lower rigid cup 2 with a circular periphery, an elastic annular wall 3 sufficiently thick to transmit the loads from the engine to the chassis, said wall being bounded in substance by two frustoconic surfaces flared downwardly and of which the small base, positioned at the top, is adhered against the core 1, its lower large base being sealingly connected to the edge of the cup 2, and a mass of liquid L filling the inside of this box 1, 2, 3, A bolt 4 whose threaded stem extends upwards is fast to the core 1 and serves for the fastening of the engine of the vehicle to this core.

As regards the cup 2, its edge is also connected to means (not shown) enabling its fixing to the chassis of the vehicle.

The core 1, or more precisely the bolt 4, is extended toward the inside of the box by a foot 5 itself terminated by a widened shoe or piston 6.

This piston 6 is of such a size that there is formed between its periphery and the inner surface facing the box 1, 2, 3 an annular gap constituting a throttled passage P for the liquid.

In addition, and in accordance with the invention, the cup 2 is emptied through at least one orifice 7, single or multiple, whose axial length is very much less than the mean diameter (here by mean diameter is meant the diameter of the circle having the same overall cross-section as the orifice concerned).

The orifice concerned is here associated with a rotary valve 8 enabling the degree of its opening to be regulated.

To this end, said valve 8 is connected angularly to the shaft 9 of a small electric motor 10 and it is arranged so as to be slidable contiguously against the lower surface of the edge of each aperture 7.

Any desirable shape can be given to the orifices 7 and to the valve 8: in the embodiment illustrated by way of example, each orifice 7 has the shape of a circular sector extending over an arc of 60 degrees, and the valve comprises three identical flat sides also having the shape of circular sectors of 60°.

A sealed and flexible bellows or diaphragm 11 is connected to the lower surface of the cup 2 so as to form with the latter a sealed pocket R of variable volume.

A protective cap 12 envelopes the bellows 11 and permits the sealed assembly of the latter on the edge of the cup 2 by turning back its own circular edge in crimping manner, around the peripheries of the following axially juxtaposed parts: the cup 2, bellows 11 and an annular reinforcing armature 13 buried in the wall 3.

The operation of the support thus described is as follows.

It is assumed initially that the rotary obturator 8 is in its extreme angular position in which the different orifices 7 are closed.

If on one of the two elements 1 and 2 oscillations or vibrations vertical with respect to one another are imposed, the result is a succession of vertical to and fro movements of the piston 6 inside the liquid 7 contained in the box, which is manifested by relative alternate back-thrusts of the annular column of said liquid L contained in the throttled annular passage P.

When the frequency of these alternate back-thrusts is equal to a predetermine value $F_0$, which depends essentially on the dimensions of the passage P and of the volume of liquid L confined beneath the piston 6, the column concerned is subjected to a resonance phenomenon which is manifested by excellent filtration of the oscillations at said frequency $F_0$ in the sense that they are practically untransmitted between the elements 1 and 2.

If then the orifices 7 are partly opened, each thrust of the piston 6 downwards is no longer obligatorily manifested by a relative reascent, through the passage P, of a volume of liquid L equal to that driven by this piston, by means of a corresponding deformation of the wall 3.

In fact, it is then possible that a portion of the volume of liquid L occurring beneath the piston 6 is driven through the orifices 7 into the pocket R with deformation of the bellows 11.

Under these conditions, the value of the frequency for which the annular column of liquid which surrounds the piston 6 enters into resonance is no longer equal to $F_0$, but to a new value $F_1$.

In addition this new value varies as a function of the degree of opening of the orifices 7 and grows in the same sense as this opening.

There is thus provided a particularly simple and effective means to regulate the value of the frequency of the oscillations which are damped to the maximum by the support concerned.

It may be advantageous to adjust the angular position of the obturator 8 such that the value of the frequency to which the support is tuned for maximum damping is automatically, at each moment, that of the oscillations which it is desired to damp to the maximum at this moment.

To this end, the actuation of the small electric motor 10 is advantageously servo-coupled to the momentary frequency of the oscillations to be damped, and especially to the frequency of the vibrations of the engine of the vehicle or, what amounts to the same thing, to the rotary speed of the output shaft of this motor.

As an improvement which is not indispensible, it is possible in addition to provide at any desirable place of the inner surface of the box a valve or diaphragm-often called "high-frequency uncoupling"—mounted so as to be oscillatible with a limited amplitude of its movements, which permits the assurance between the two elements 1 and 2 of damping for vibrations of relatively small amplitude (for example of the order of 0.5 mm) and of frequency generally comprised between 20 and 50 Hz; such a "diaphragm" is especially in the form of a rigid disk 15 with an axis X mounted close to the bottom of the cup 2 between two annular stops 16, 17 fast to this cup and making possible the vertical movements of the disk 15 concerned with an amplitude limited to 0.5 mm, the liquid L being able to pass from one side to the other of this disk, around the latter, as long as it is not applied against one of these stops.

In combination with the feature which has just been described, it may be advantageous to hollow out in the cup 2, and in particular in its thickened annular periphery, a channel 14 having a length very much greater than its average diameter, said channel remaining permanently open and connecting the respective inner spaces of the box 1, 2, 3 and of the pocket R to one another:this channel 14 plays a role substantially similar to that of the throttle passage P in the sense that the column of liquid L positioned in said channel is also driven back alternately into the latter during the application of relative axial oscillations between the two elements 1 and 2, which permits effective damping to be ensured for a frequency which depends on the sizes of the channel 14, at least as long as the orifices 7 remain closed or hardly disengaged, and the total disengagement of these orifices can have the effect of short-circuiting the channel 14.

Figure 3:
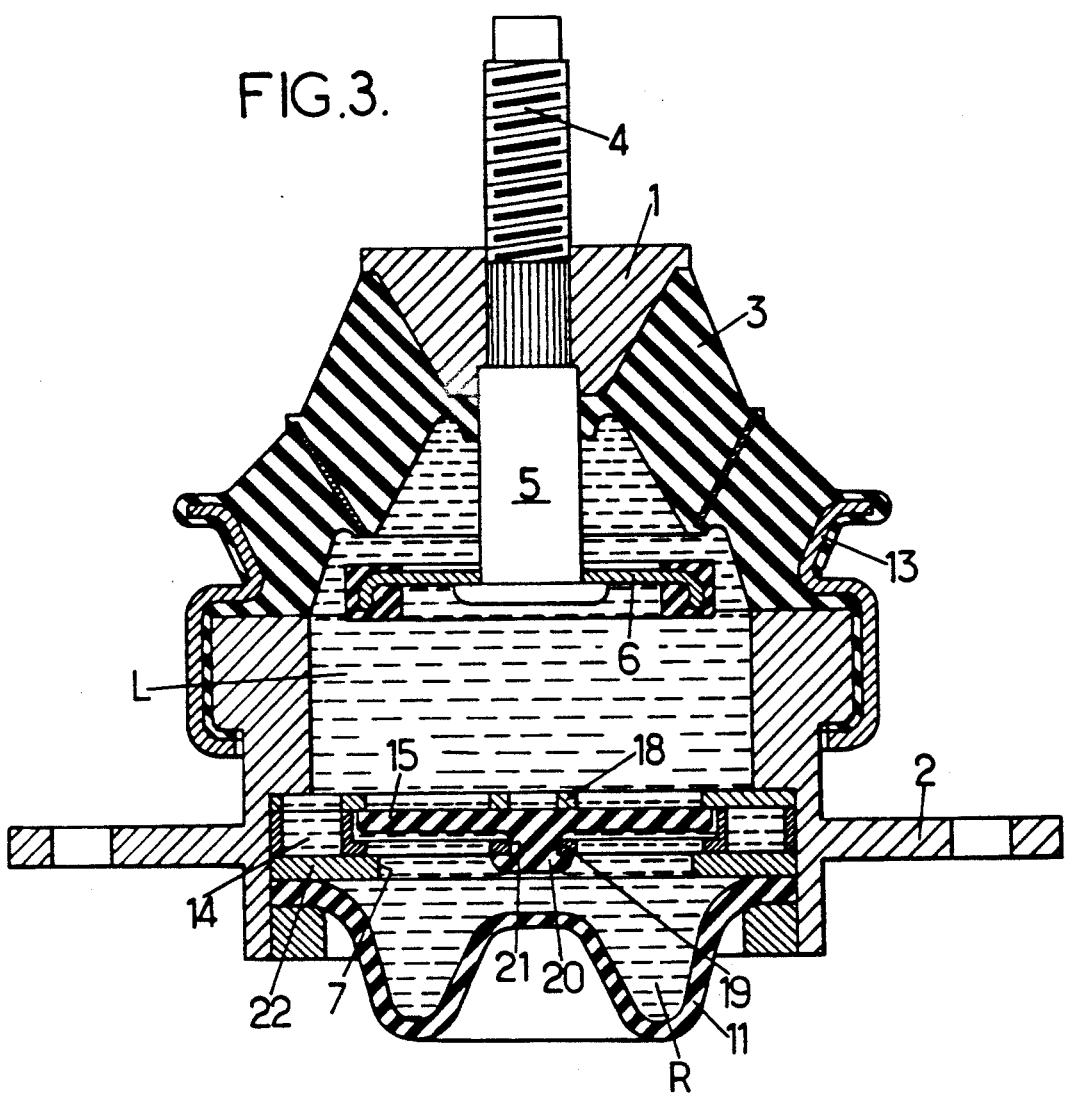
FIG. 3 shows in axial section, another antivibratory support constructed according to the invention.
Figure 4:
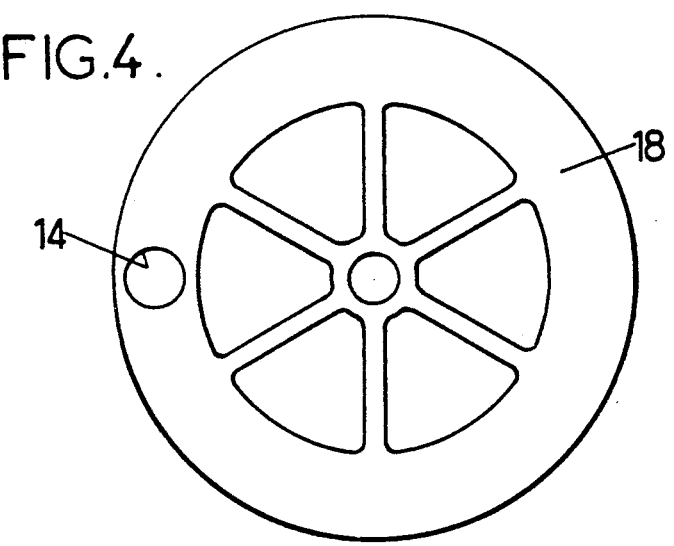
FIG. 4 shows in plan view one of the two grids of this support.

In the embodiment illustrated in FIGS. 3 and 4, the elements similar to those previously described bear the same reference numerals as previously.

This embodiment differs essentially from the preceding one in that the cross-section of the port 7 is no longer here adjustable at will: it is assumed here that it has its optimum value previously determined at the factory as a function of the use proposed, for example by means of a prototype with an adjustable aperture such as described previously.

In this embodiment in addition, the valve 15 is contained with play between two flat and parallel grids 18 and 19 and it is constituted by a deformable pastille of rubber centered by means of a central button 20 with a widened head derived from molding with it and force-fitted into a complementary central housing 21 of one of the grids.

The sizes of the valve and of the rigid parts constituting the grids are such that, when the valve is not applied against one of the grids, the liquid L can flow freely through the latter, at least as long as the given value of the relatively "high" frequency of the vibrations to be damped is not reached, said value corresponding to the "resonance" of the liquid mass then "throttled" in the nozzle constituted by said grids.

The port 7 is here the circular hole formed in a washer 22 juxtaposed axially beneath the lower grid 19 and its average diameter is preferably greater than that of the apertures of each grid.

In each case, the length, taken in the direction of flow of the liquid, of each port 7, is much smaller than the overall average diameter of this port.

The ratio between said average diameter and said length is advantageously of the order of 5 to 20, or even greater than 20.

For a diameter of the piston 6 of the order of 50 to 70 mm, the length of the port 7 is for example of the order of 2 to 3 mm for an average diameter of the order of 10 to 50 mm.

It will be noted that, for the throttled passage 14, if it is provided, the ratio between the mean diameter and the length is distinctly less than 1 instead of being distinctly greater than 1, this ratio being generally less than 1/5 and even than 1/10.

As a result of whichever embodiment is adopted, there is provided an anti-vibratory support whose constitution and operation results sufficiently from the foregoing.

This support has a certain number of advantages with respect to those previously known and in particular that of making possible in an extremely simple and effective manner an adjustment of the optimum damping frequency which corresponds to the placing of the annular column of liquid surrounding the piston which is immersed in the box into resonance.

As is self-evident, and as emerges from the foregoing, the invention is no way limited to those of its methods of application and embodiments which have been more especially envisaged; it encompasses, on the contrary, all modifications, particularly:

those where a rigid ring of axis X made fast with the cup 2 and immersed in the box 1, 2, 3, would surround with play the foot 5 so as to serve if necessary as an axial stop for the piston 6 during the application of an axial traction thrust which is too high on one of the two parts 1 and 2 with respect to the other, which then avoids destruction of the support by "tearing", those where the piston 6 would be hollowed axially by perforations or notches, those where the valve 8 associated with external actuating members would be axially and not angularly movable and would then comprise, particularly, a frustoconic edge adapted to coact with a frustoconic fixed seat, those where said valve 8 with external actuation would be alone held to the exclusion of the throttle channel 14 and of the vibrating valve 15, the equilibrium between the liquid pressures existing respectively inside the box 1, 2, 3 and the pocket R being then advantageously obtained by the creation of "leaks" between the valve 8 in its closed position and the seat of this valve, and those where the "uncoupling diaphragm" 15 above would be arranged, not inside the box 1, 2, 3 particularly above its bottom, but inside the pocket R, especially in series with the group of orifices 7, between the valve 8 and the bellows 11.

We claim:

1. Hydraulic anti-vibratory device designed to be inserted for the purposes of support and damping between two rigid elements, constituted by a sealed box comprising a rigid core fixedly attachable to one of the two rigid elements, a rigid base which is fixedly attachable to the other rigid element, and an annular supporting elastic wall connecting the core to the base in sealed manner, the inner space of said box being filled with a liquid and the core being extended, inside the box, by a rigid foot which terminates at a piston, the liquid being provided on first and second opposite sides of the piston, and the outer contour of the piston being shaped to define with the opposite wall of the box a throttled annular passage for throttling flow of the liquid between said first and second opposite sides of the piston, the base outside the box being capped by a flexible and sealed bellows sealingly connected to the base to form with the base a pocket of variable volume for the liquid and said base being perforated by at least one port whose length is very much less than the mean diameter of the port, said port connecting between one another the inner spaces of the box and of the pocket.

2. Device according to claim 1, wherein, for a diameter of the piston of the order of 50 to 70 mm, the length of the port is of the order of 2 to 3 mm and the mean diameter of the port is of the order of 10 to 50 mm.

3. Device according to claim 1, wherein the inner surface of the box is bounded in part by a valve to vibrate with movements of limited amplitude.

4. Device according to claim 3, wherein the valve is mounted so as to be able alternately to obturate and disengage the port.

5. Device according to claim 3, wherein the valve is contained with play between two grids mounted in series with the port, and wherein the overall mean diameter of the apertures of each grid is less than the mean diameter of the port.

6. Device according to claim 3, wherein the base is perforated in addition by at least one channel, the length of the channel being very much greater than the mean diameter of the channel, said channel connecting with one another the inner spaces of the box and of the pocket.

7. Device according to claim 1, including an obturator valve associated with external actuating means for varying the degree of opening of the port.

8. Device according to claim 7, including a small electric motor having a shaft, the actuation of which is servo-coupled to the frequency of the oscillations to be damped to the maximum, said obturator valve being rotary and connected angularly to the shaft to be turned by turning the shaft so as to relate the port opening and said frequency.

* * * * *